July 3, 1962 J. H. GOLDMAN 3,042,216
FILTER CONSTRUCTION
Filed Feb. 5, 1959

INVENTOR.
JOSHUA H. GOLDMAN
BY
ATTORNEY

3,042,216
FILTER CONSTRUCTION
Joshua H. Goldman, Box 14, Hadlyme, Conn.
Filed Feb. 5, 1959, Ser. No. 791,350
7 Claims. (Cl. 210—494)

My present invention relates to the filter art, and more particularly to a novel construction of a fluid filter.

The principal object of the present invention is to provide a filter having alternate layers of fine filtering media and coarse separators.

Another object of the present invention is to provide a fluid filter which permits the use of several types of filtering media to provide a true depth filter.

A further object of the present invention is to provide a fluid filter which is simple in construction and easy and economical to manufacture and assemble.

With the above and other objects and advantageous features in view, my invention consists of a novel arrangement of parts and a novel method of manufacture, more fully disclosed in the detailed description following, in conjunction with the accompanying drawings, and more particularly defined in the appended claims.

It has been found desirable to form fluid filters with suitable separators between layers of filtering media to prevent matting. The filter of the present invention provides a foraminous separator which also acts as a strainer, diffuses the flow of fluid, and prevents matting. Furthermore, the present invention permits the use of different filtering media to form a true depth filter.

Figure 1:
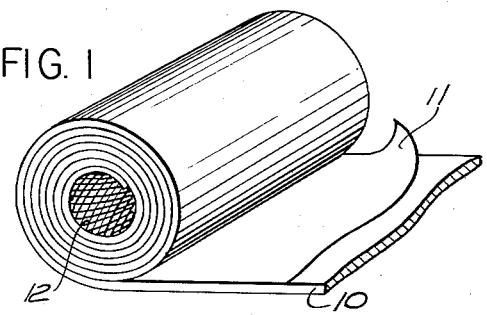
FIG. 1 is a perspective view of a partially completed filter embodying my invention.
Figure 2:
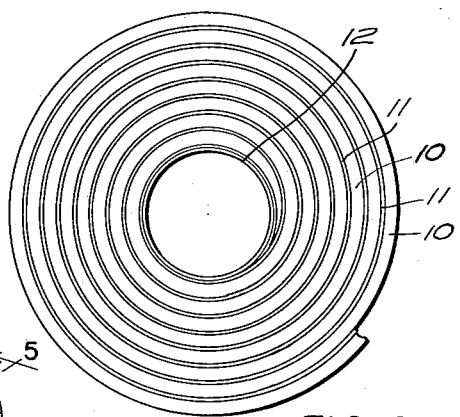
FIG. 2 is an enlarged end view of the filter.

Referring to the drawings, FIGS. 1 and 2 illustrate the simplest form of my invention. The filter shown therein is in the form of a conventional cartridge. This cartridge is formed by providing a bat 10 of a pervious non-woven mat of bast fiber such as sisal, hemp, or a coarse mat of glass, wire, etc. The filtering media 11 comprises a permeable septum which may comprise non-woven textile fibers, loosely woven cotton or textile fibers, man made fibers such as nylon, Orlon, Dacron, etc., very fine metallic mesh or pervious paper, cellulose nitrate, cellulose acetate, etc. The layers are wound around a tubular core 12 of wire mesh or perforated metal. The resultant filter is formed of alternate layers of the separator and filtering media spirally disposed around the core. The bat 10 serves as a structural support for and a separator between the alternate layers of the filter media. However, its function is not structural only. The outermost layer may act as a strainer, but the inner layers serve to diffuse the flow and to keep the filtering media apart to prevent matting.

Figure 4:
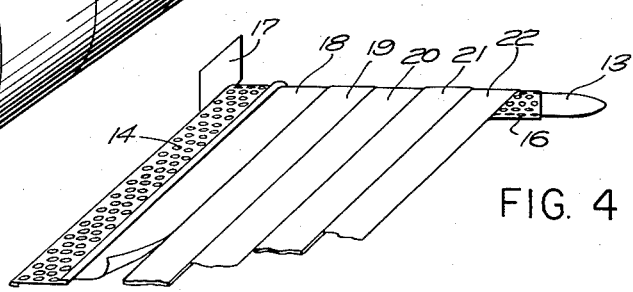
FIG. 4 is a diagrammatic view illustrating the method of manufacture of the filter shown in FIG. 3.

The above described filter is simple in construction and easy and economical to assemble. However it may be desirable to provide the filter with several types of filtering media concentrically arranged. In the form shown in FIGS. 1 and 2 it is conceivable that fluid under pressure will follow the spiral convolutions of the coarse fibers without passing through the filter media. To provide a multiplicity of concentric layers of different materials without seams I have devised the method illustrated in FIG. 4. A cantilever mandrel 13 is rotatably mounted in a fixed support. Close to the support a ribbon of perforated metal 14 is fed on to the mandrel at an angle to the mandrel. The edges of the metal 14 are provided with opposed U-shaped portions 15 which interlock. A pressure roll can then be positioned on the opposite side of the mandrel to roll the interlocked edges and form a metal tube 16 which is moved axially along the mandrel by the reaction of the strip 14 to the fixed shoulder 17.

Figure 5:
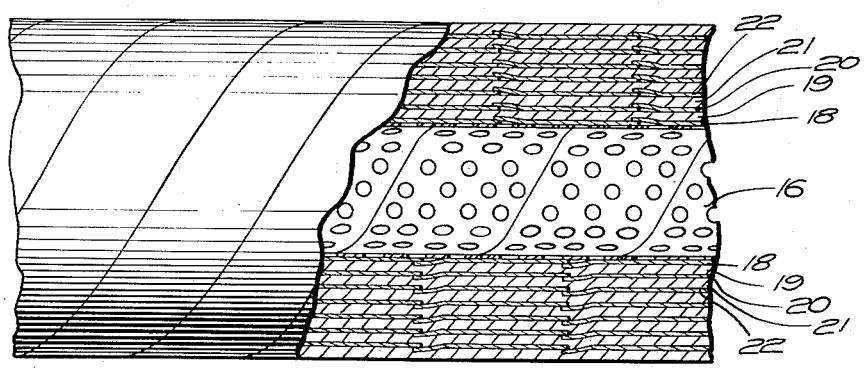
FIG. 5 is an enlarged fragmentary section taken on line 5—5 on FIG. 3.
Figure 6:
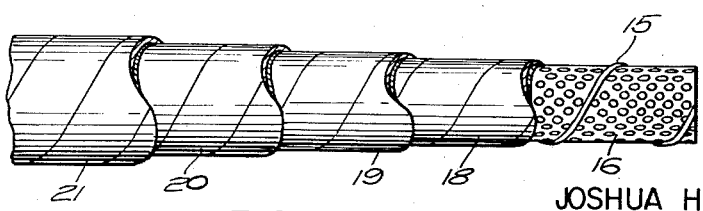
FIG. 6 is a side elevation of the filter shown in FIG. 3 with the various layers broken away.

Adjacent the metal strip is a ribbon of filtering media 18 which is drawn on to the core 16 in a continuous spiral form. Adjacent the filtering strip is a strip of bast fiber separator 19 followed by a second filtering strip 20 which may differ in permeability from the strip 18. The strip 20 is followed by another separator 21 and another filtering media 22. Alternate strips of separator and filter are used until the desired size of cartridge is attained. The spiral wind is then fixed in position by a superficial wrap of perforated paper tape or metal similar to the core. After leaving the mandrel 13 the cartridge is cut to the desired length by a conventional flying shear. The strips are all fed at the same angle. However, the width of the filter media is greater than the width of the separator to provide a slight overlap to the turns of the filter media as shown in FIG. 5 to prevent the possibility of a break in the continuity of the surface.

Figure 3:
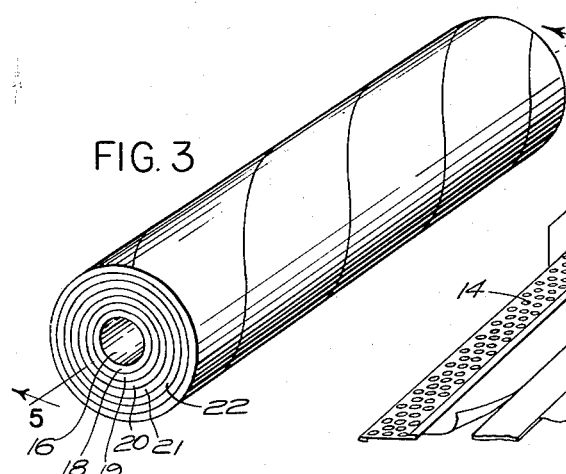
FIG. 3 is a perspective view of a modified form of the filter.

As can be seen in FIG. 3 the finished cartridge provides alternate concentric layers of separator and filter media. Both the separators and the filter media may vary in thickness, density and material. Thus, for example, strip 18 may be a closely woven flannel cloth, permeable chamois skin, ethyl or nitro-cellulose membrane, or a felted fabric. Strip 19 may be a porous felt sheet, strip 20 may be a wire or filament woven screen and strip 21 may be a thin bat of bast fibers. Such a structure would permit selective filtration in which only the very fine suspended solids would reach the final medium. Thus the filter is provided with the finest material adjacent the core graduating outwardly to the coarsest filtering material. This results in filtering in depth.

The above method of manufacture thus permits a selection of a wide range of separators and filtering media in a single cartridge to provide a true depth filter. This permits a longer free flow of fluid with less clogging and matting. Other advantages of the present invention will be readily apparent to a person skilled in the art.

I claim:

1. A method of forming a fluid filter cartridge comprising the steps of spirally winding a narrow perforate metal strip on a mandrel at an angle to the axis to form a tubular core, and simultaneously winding alternate narrow strips of a separator and a filtering medium in alternate adjacent layers on said core at an angle to the axis until the desired diameter is obtained, said strips being spirally wound while advancing along the mandrel with overlap between turns.

2. A fluid filter cartridge comprising a tubular perforate core, and a plurality of layers of separators and filtering media spirally wound in concentric convolutions alternately in adjacent layers around said core, said spiral windings advancing axially along said core with said filtering media overlapping between turns, said separator comprising a pervious non-woven mat of bast fibers and said filtering medium comprising a permeable septum.

3. A fluid filter cartridge comprising a tubular perforate core, and a plurality of layers of separators and filtering media spirally wound in concentric convolutions alternately in adjacent layers around said core, said spiral windings advancing axially along said core with said filtering media overlapping between turns, said separator comprising a pervious non-woven mat of bast fibers and said filtering medium comprising a permeable septum of loosely woven textile fibers.

4. A fluid filter cartridge comprising a tubular perforate core, and a plurality of layers of separators and filtering media spirally wound in concentric convolutions alternately in adjacent layers around said core, said spiral windings advancing axially along said core with said filtering media overlapping between turns, said separator comprising a pervious non-woven mat of sisal and said filtering medium comprising a permeable septum.

5. A fluid filter cartridge comprising a tubular perforate core, and a plurality of layers of separators and filtering media spirally wound in concentric convolutions alternately in adjacent layers around said core, said spiral windings advancing axially along said core with said filtering media overlapping between turns, said separator comprising a pervious non-woven mat of bast fibers and said filtering medium comprising a permeable septum of non-woven textile fibers.

6. A fluid filter cartridge comprising a tubular perforate core, and a plurality of layers of separators and filtering media spirally wound in concentric convolutions alternately in adjacent layers around said core, said spiral windings advancing axially along said core with said filtering media overlapping between turns, said separator comprising a pervious non-woven mat of sisal and said filtering medium comprising a permeable septum of non-woven textile fibers.

7. A fluid filter cartridge comprising a tubular perforate core, and a plurality of layers of separators and filtering media spirally wound in concentric convolutions alternately in adjacent layers around said core, said spiral windings advancing axially along said core with said filtering media overlapping between turns, said separator comprising a pervious non-woven mat of bast fibers and said filtering medium comprising a permeable septum, said filtering media varying in thickness, density and material construction and arranged progressively to provide the finest filter adjacent said core and the coarsest filter at the perimeter to form a filter in depth.

References Cited in the file of this patent

UNITED STATES PATENTS

| | | |
|---|---|---|
| 1,606,647 | McCutcheon | Nov. 9, 1926 |
| 2,203,815 | Dahl | June 11, 1940 |
| 2,421,704 | Kasten | June 3, 1947 |
| 2,427,733 | McCann | Sept. 23, 1947 |
| 2,550,853 | Nugent | May 1, 1951 |
| 2,609,932 | Fricke | Sept. 9, 1952 |
| 2,736,433 | Fresch | Feb. 28, 1956 |
| 2,742,160 | Fogwell | Apr. 17, 1956 |
| 2,829,775 | Krogman | Apr. 8, 1958 |

FOREIGN PATENTS

| | | |
|---|---|---|
| 502,000 | Canada | May 4, 1954 |